United States Patent [19]

Deja

[11] 4,319,486
[45] Mar. 16, 1982

[54] REVERSING THERMOMETER FRAME

[75] Inventor: Edmund P. Deja, Saginaw, Mich.

[73] Assignee: Trippensee Corporation, Saginaw, Mich.

[21] Appl. No.: 119,222

[22] Filed: Feb. 7, 1980

[51] Int. Cl.³ .......................... G01K 1/14; G01N 1/10
[52] U.S. Cl. .................................. 73/343 B; 73/371; 73/864.67
[58] Field of Search ............ 73/354, 425.4 R, 864.67, 73/371, 343 B

[56] References Cited
U.S. PATENT DOCUMENTS

| | | | |
|---|---|---|---|
| 2,198,116 | 4/1940 | Jurs | 73/425.4 R |
| 2,388,548 | 11/1945 | Jurs, Jr. | 73/425.4 R |
| 2,391,978 | 1/1946 | Kahl | 73/425.4 R |
| 3,097,532 | 7/1963 | Brown et al. | 73/425.4 R |
| 3,793,889 | 2/1974 | Niskin | 73/354 X |

*Primary Examiner*—Daniel M. Yasich
*Attorney, Agent, or Firm*—Learman & McCulloch

[57] ABSTRACT

A reversing thermometer frame adapted to be clamped to a water sampler and lowered to a predetermined depth in a body of water. The frame has a base coupled to a case containing one or more of the reversing thermometers. The thermometer case is rotatable through about 180° and is biased by a torsion spring reacting between the case and the biase for rotation from a first position to a second position. A releasable latch reacts between the base and the case to latch the latter in its first position against the bias of the spring. The thermometer case is open at one end for the insertion and removal of thermometers. At the open end of the case is a closure that is linearly and rotatably movable relative to the case so as selectively to close and open the open end of the case. The connection between the case and the closure is such that the latter must move linearly a predetermined distance relative to the case before it can be rotated, thereby preventing inadvertent loss of the thermometers.

19 Claims, 6 Drawing Figures

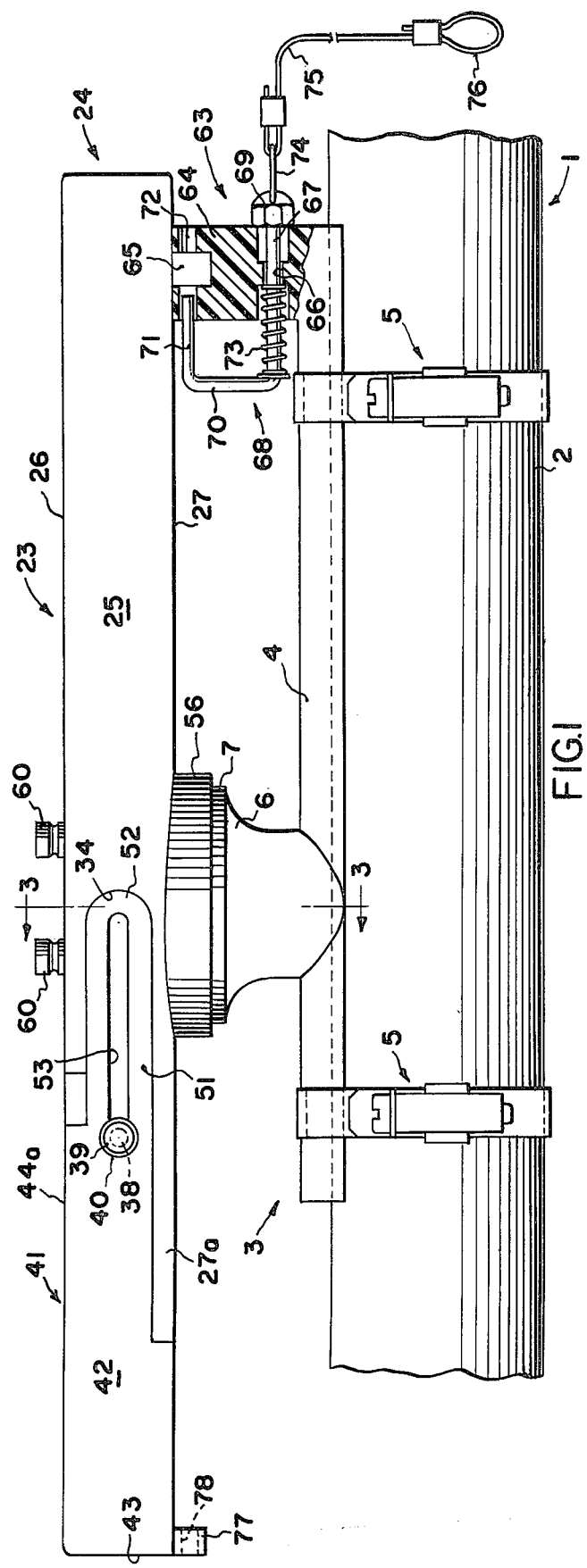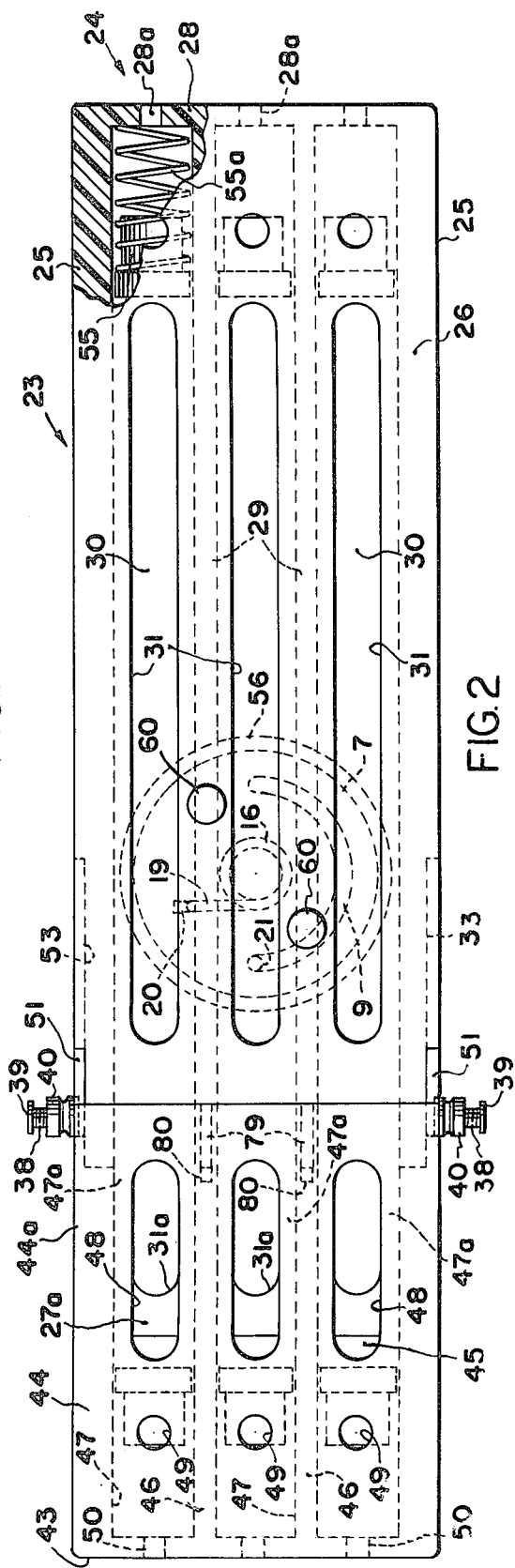

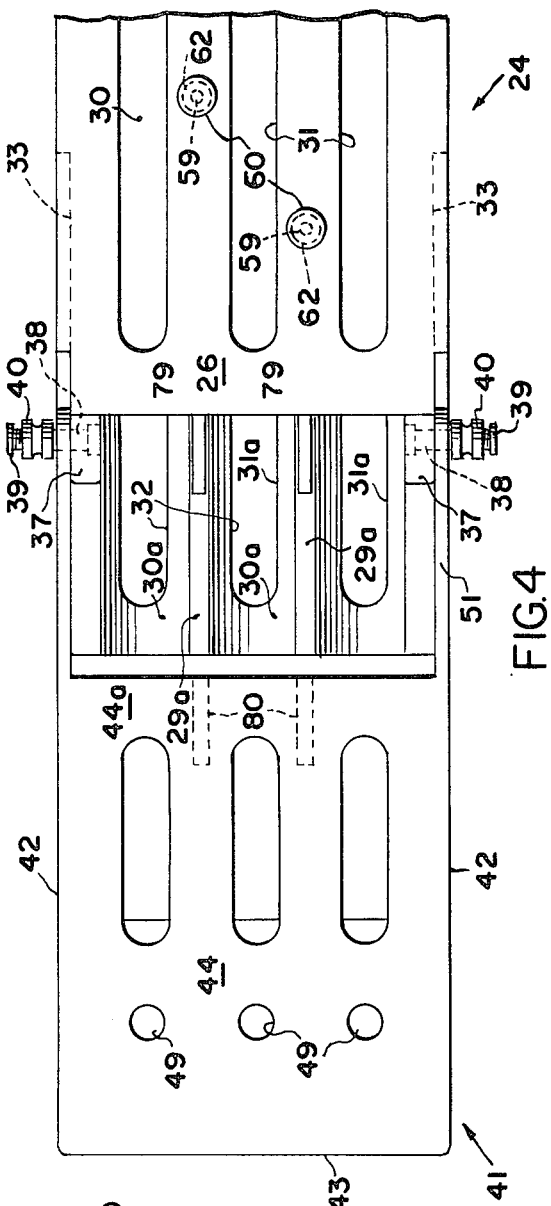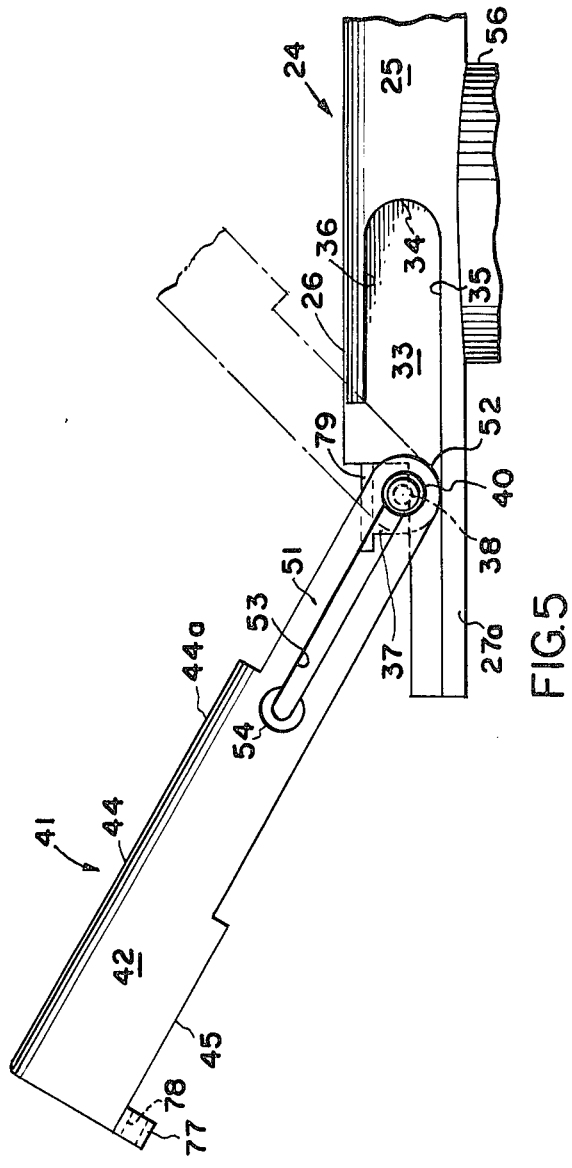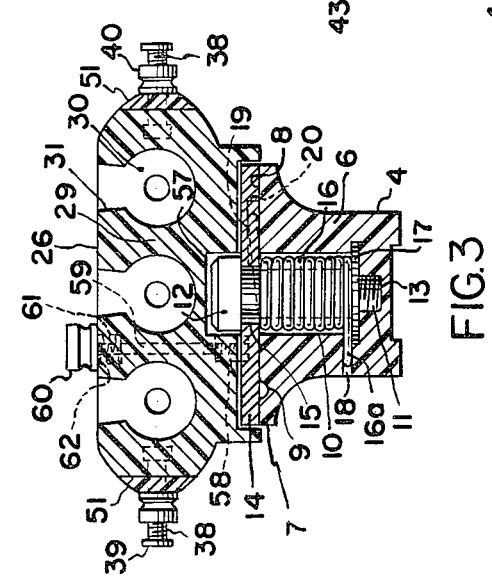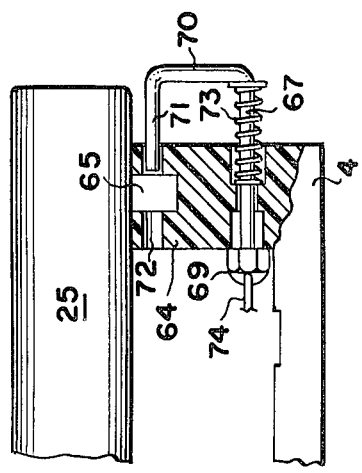

REVERSING THERMOMETER FRAME

BACKGROUND OF THE INVENTION

The invention relates to a frame construction adapted to support one or more reversing thermometers for use in measuring the temperature of a sample of water taken at a predetermined depth from a body of water. When a sample is taken from a body of water the temperature of the sample at the time it is taken often is required to be known. Since water temperatures vary at different depths and since water temperatures may be considerably different from atmospheric temperatures, a so-called reversing thermometer has been developed which, when turned end for end, will continue to indicate the temperature indicated by the thermometer just prior to its being turned, even though the thermometer subsequently may be exposed to different temperatures.

The prior art contains several examples of reversing thermometer frames. For example, such frames are shown in each of the U.S. Patents to Brown, No. 2,012,741; Niskin, No. 3,242,740; Lowdermilk, No. 3,357,250; Greene et al, No. 3,610,037; and Niskin, No. 3,793,889.

All of the known reversing thermometer frames suffer from one or more undesirable characteristics, a chief one of which is the necessity of having to dissassemble parts of the frame to transfer a thermometer to and from its supporting case. More often than not, the thermometers must be transfered to and from their supporting cases aboard ship and under conditions such that dissassembled parts, or the thermometers, or both, can be damaged or lost overboard. Further, known reversing thermometer frames require either the use of tools to effect their assembly and dissassembly, or have exposed operating parts which can be damaged or become entangled with other apparatus.

A principal object of the present invention, therefore, is to provide a reversing thermometer frame construction which overcomes the aforementioned undesirable characteristics.

SUMMARY OF THE INVENTION

A reversing thermometer frame constructed according to the invention has a base adapted to be clamped to a water sampler and to which is rotatably coupled a housing or case in which one or more reversing thermometers may be accommodated. The base is equipped with a hub on which is mounted a rotor that is fixed to the thermometer case. A torsion spring reacts between the hub and the rotor to bias the latter and the case to a rest position from which the case can be rotated through 180° to a cocked position, thereby stressing the spring so as to enable return of the case to its rest position under the force of the spring when desired. A releasable latching mechanism reacts between the case and the base to disable rotation of the latter from its cocked position until such time as the latch is released. The latch is provided with an actuator that may be coupled to a movable part of the water sampler so as to effect release of the latch in response to movement of such part of the sampler.

The thermometer case is closed at one end and open at its opposite end, and is provided with one or more cavities accessible through the open end for the accommodation of a corresponding number of thermometers. The thermometers preferably are longer than the body so that the thermometers project beyond the open end of the body.

At the open end of the body is a closure having a pair of fingers which straddle the body and are slidably accommodated in grooves. Each groove has a pair of side edges which, together with the fingers, function as guides and enable linear movement of the closure longitudinally of the body, but prevent rotary movement of the closure except in a predetermined position of the latter relative to the body. Pins project beyond both sides of the body and pass through slots formed in the fingers so as to provide fulcrums about which the closure may rock when the latter has been moved linearly relative to the body a distance sufficient to enable disengagement of the fingers from the side edges of the grooves.

The closure has a head at one end provided with a number of chamber corresponding to the number of chamber in the body and in register therewith so that, when thermometers are accommodated in the case, corresponding ends of such thermometers will be supported by the closed end of the body and the opposite ends of the thermometers will be supported by the head of the closure. The thermometers themselves, therefore, prevent rotation of the closure relative to the body until such time as the closure has been moved longitudinally of the body a distance sufficient to enable the thermometers to be wholly withdrawn from the chamber in the head.

No tools are required to effect transfer of thermometers to or from the case, nor do any of the parts of the apparatus have to be separated from any other part to effect such transfer of thermometers.

DESCRIPTION OF THE DRAWINGS

A reversing thermometer frame constructed in accordance with a preferred embodiment of the invention is illustrated in the accompanying drawings, wherein:

FIG. 1 is a side elevational view, with parts broken away, showing the frame mounted on a water sampler;

FIG. 2 is a top plan view, partially broken away, of the frame;

FIG. 3 is a sectional view taken on the line 3—3 of FIG. 1;

FIG. 4 is a fragmentary view similar to FIG. 2, but illustrating the closure in a longitudinally adjusted position relative to the case;

FIG. 5 is a side elevational view of that portion of the apparatus shown in FIG. 4, but with the closure in a position of rotary adjustment; and FIG. 6 is a partly elevational and partly sectional view illustrating the latch mechanism in a different position from that shown in FIG. 1.

THE PREFERRED EMBODIMENT

A thermometer frame constructed in accordance with the invention is adapted for use in connection with any one of a number of different kinds of water samplers 1 such as a Kemmerer style sampler having a tubular body 2 open at both ends and being fitted at each end with stoppers or closures movable into sealing relation with the ends of the body. A water sampler of this kind is disclosed in Snyder et al U.S. Pat. No. 4,027,538, granted June 7, 1977, and to which reference may be had for a more complete description. It is sufficient for purposes of this disclosure, however, to state that the sampler 1, with both of its ends open, may be lowered into a body of water to a desired depth, whereupon the stoppers may be actuated to close the ends of the body 2 and trap within the latter a sample of water. If it is desired to measure the temperature of the sample at the depth at which it is taken, one or more reversing thermometers may be assembled in a supporting frame and the frame mounted on the sampler 1.

A reversing thermometer frame constructed in accordance with the invention comprises a base 3 having an elongate member 4 adapted to be placed against one side of the body 2 and fixed to the latter by clamps 5 of known construction. Forming part of the base 3 and projecting from the member 4 is a stem 6 terminating at its free end in a hub 7 having an outer surface 8 which is flat except for an arcuate groove 9 (FIG. 2) of about 180° in length. The stem 6 has a cylindrical chamber 10 (FIG. 3) therein through which extends an anchor bolt 11 having a head 12 at one end. The other end of the bolt is threaded and is accommodated in a correspondingly threaded bore 13 at the base of the chamber 10.

Rotatably supported on the surface 8 of the hub 7 is a rotor disc 14 (FIG. 3) having a central opening 15 through which the bolt 11 passes freely, the opening 15 being smaller in diameter than that of the bolt head 12 so that the latter overlies the rotor.

Accommodated in the chamber 10 is a torsion spring 16 (FIG. 3) which bears at one end against a washer 17 at the base of the chamber and which bears at its opposite end against the rotor 14. One end 16a of the spring projects into a bore 18 extending transversely of the chamber, and the opposite end 19 of the spring projects into a radial groove 20 formed in the rotor. The arrangement is such that the spring 16 constantly biases the rotor 14 to rotate in a clockwise direction, as viewed in FIG. 2. Rotation of the rotor through more than about 180°, however, is prevented by a limiting pin 21 fixed to the rotor and extending into the arcuate groove 9.

The apparatus includes a housing or case 23 for the removable accommodation of a number of reversing thermometers (not shown). The case includes a body member 24 having spaced, parallel side walls 25, a top wall 26, and a bottom wall 27. One end of the body 24 is closed by an end wall 28, the opposite end of the body being open. Extending longitudinally of the body between the top and bottom walls is a plurality of spaced apart, parallel ribs 29 which form a plurality of cylindrical chambers 30 in each of which a thermometer may be accommodated. The top and bottom walls 26 and 27 of the body preferably are provided with a plurality of slots 31 and 32, respectively, through which water may circulate, and the end wall 28 is provided with an opening 28a in communication with each chamber 30 to enable water to drain therefrom.

At the closed end of the body 24 the top and bottom walls 26 and 27 are flush, but at the opposite end of the body the bottom wall 27 has an extension 27a which projects beyond the top wall 26. The extension has upstanding ribs 29a that extend in prolongation of the ribs 29 so as to form troughs 30a in communication with the chambers 30. The extension 27a also is provided with slots 31a to permit water to enter the troughs 30a.

Adjacent the open end of the body 24 each side wall 25 is provided with a longitudinally extending groove 33 having an arcuate end 34 and spaced apart side edges 35 and 36. The edge 35 extends the full length of the extension 27a, but the edge 36 terminates short of the free end of the top wall 26. Each side wall 25 has a stepped portion 37 (FIGS. 4 and 5) at the open end of the body 24 and in which is fixed a laterally projecting, threaded pivot pin 38 having an enlarged head 39. Fitted onto each pin 38 is a correspondingly threaded nut 40.

The thermometer case also includes a closure 41 for the open ends of the chambers 30 in the body 24. The closure comprises a pair of parallel side walls 42, a transverse head 43, and top and bottom walls 44 and 45, respectively. The top wall has an extension 44a which projects beyond the bottom wall 45 by an amount corresponding substantially to the distance that the extension 27a of the body 24 projects beyond the top wall 26. Between the top and bottom walls 44 and 45 are ribs 46 which form cylindrical chambers 47 like the chambers 30, and the chambers 47 extend into the head 43. The extension 44a has upstanding ribs 47a adapted to overlie the ribs 29a. The top wall 44 and the extension 44a are provided with slots 48 through which water may pass. The top wall 44 also has openings 49 in communication with the chambers 47 and the bottom wall 45 has similar openings (not shown). The head 43 has drainage openings 50 in communication eith the chambers 47.

Each of the side walls 42 of the closure 41 has an extension or finger 51 terminating in an arcuate end 52 and provided with an elongate slot 53. The fingers 51 straddle the free end of the body 24 for slidable accommodation in the associated groove 33. The pivot pins 38 extend through the slots 53 with the nuts 40 outboard of the fingers 51, thereby maintaining the closure 41 assembled with the body 24, and providing a fulcrum about which the closure may rock under certain conditions to be explained.

To enable relative movement between the body 24 and the closure 41, the nuts 40 are loosened whereupon the closure manually may be slid linearly along the longitudinal axis of the body. The side walls 35 of the grooves 33 at all times prevent rotation of the closure 41 counterclockwise, as viewed in FIGS. 1 and 5, and provide a guide during linear movement of the closure. As long as some portion of the walls 36 of the grooves overlie the fingers 51, clockwise rotation of the closure is prevented. When the closure has been slid away from the body 24 a distance such that the walls 36 no longer overhang the fingers 51, however, the closure manually may be rocked clockwise, as illustrated in FIG. 5, the arcuate ends 52 of the fingers permitting such rotation. Thus, the closue 41 is movable relatively to the body 24 both linearly and rotatably, and such movements occur sequentially.

When the closure 41 is in its cavity-closing position, as shown in FIG. 1, the top wall 26 of the body abuts the extension 44a of the closure and the extension 27a of the body abuts the bottom wall 45 of the closure. Further, the cavities in the members 24 and 41 are in longitudinal registration so as to enable thermometers to extend virtually the entire length of the case 23.

To guard against inadvertent sliding movement of the closure 41 relative to the body 24 when the case 23 contains thermometers, each of the side walls 42 of the closure preferably has a counterbore or recess 54 at the inner end of the slot 53 for the accommodation of the associated nut 40. The reception of the nuts 40 in the recesses provides a positive locking arrangement between the closure and the body.

Each of the thermometer accommodating chambers of the case 23 includes shock absorbing means for engagement with the associated thermometer. Each shock absorbing means comprises a rubbery cup 55 fitted into a compression spring 55a which seats against the end wall 28 and 43 of the members 24 and 41, respectively.

Means is provided for separably coupling the case 23 to the support 3 and comprises a socket 56 carried by the bottom wall 27 of the body 24 and in which the hub 7 and the rotor 14 are accommodated. The bottom wall 27 is provided with a recess 57 in which the head 12 of the anchor bolt 11 is received. Fixed to the rotor 14 is a pair of internally threaded socket members, one of which is shown at 58 in FIG. 3, and removably fitted into each socket member is one end of a threaded bolt 59 having a head 60 at its opposite end. The upper wall 26 of the body 24 has a pair of short bores 61 therein and through which the bolts 59 extend, and between the base of each bore and the head 60 of the screw is a compression spring 62 which prevents inadvertant rotation of the bolts 59. The arrangement is such that the rotor 14 is fixed to the body 24, whereby any rotary movement imparted to the rotor 14 or to the case 23 is transmitted to the other.

As was stated earlier, the case 23 is rotatable relatively to the base 4 and is biased by the spring 16 to rotate in one direction. When the case is rotated in a direction against the biasing force of the spring, the case must be latched so as to overcome the force of the spring. Apparatus constructed according to the invention includes latch means 63 for such purpose.

The latch means 63 comprises an upstanding flange 64 at one end of the base member 4 and having a slot 65 at its free end. Extending through the flange 64 is an opening 66 in which is slidably accommodated one leg 67 of a substantially J-shaped latch member 68, the leg 67 having fixed to one end thereof an eyelet 69 and being joined at its other end by a web 70 to a leg 71 that parallels the leg 67 and is reciprocable in a bore 72 which extends through the flange 64 and communicates with the slot 65. A spring 73 encircles a portion of the leg 67 and constantly biases the latch member 68 to a position in which the leg 71 is clear of the slot 65.

Fixed to the eyelet 69 is a ring 74 to which also is secured one end of an operating cable 75 having a loop 76 at its other end. The loop 76 is adapted to be fastened to a stud or the like carried by one of the stoppers or closures of the sampler 1 so that, when the stopper is in its open position, the cable will overcome the force of the spring 73 and cause the leg 71 to span the slot 65. When the stopper moves to its closed position, however, the cable will slacken and enable the spring 73 to return the latch member 68 to the position shown in FIG. 1.

The latch means also includes a tongue 77 depending from the bottom wall 45 of the closure 41, the projection being of such size as freely to enter the notch 65. The tongue 77 has a opening 78 therethrough for the accommodation of the latch leg 71.

The latch mechanism 63 may be assembled in the manner shown in FIG. 1 or alternatively, in the manner shown in FIG. 6. In either case, the component parts and their function are the same.

To condition the apparatus for operation, the base 3 is clamped to the body 2 of the sampler 1 and the closure 1 swung to the position indicated in chain lines in FIG. 5, thus enabling one or more thermometers to be inserted into the chambers 30 in body portion 24 of the case. Preferably, the thermometer are of greater length than the body portion 24 so that they project beyond the bottom wall extension 27a. Following insertion of the thermometers into the body portion 24 the closure 41 may be swung counterclockwise from the chain line position shown in FIG. 5 until such time as the fingers 51 engage the side walls 35 of the grooves 33, whereupon the fingers 51 will be aligned with the grooves. This is the position of the closure 41 shown in FIG. 4. The closure 41 then may be slid linearly toward the body portion 24, the fingers 51 and the side walls 35 and 36 of the grooves 33 guiding the closure 41 during such movement.

As the closure 41 is slid toward the body 24, those ends of the thermometers which extend beyond the bottom wall extension 27a will enter the chambers 47, thereby enabling the rubbery cups 55 at the opposite ends of each of the thermometer cavities to engage the ends of the thermomters. The cups, together with the springs 56, provide cushioned supports for the thermometers.

When the closure 41 has been slid to a position in which its upper and lower walls engage the upper and lower walls of the body 24, the locking nuts 40 may be rotated so as to occupy the recesses 54 and cause the fingers to bear against the sides of the closure. The seating of the nuts 40 in the recesses thus locks the closure against linear movement relative to the body 24. The case 23 may be swung counterclockwise 180° from the position shown in FIG. 2 so as to fit the tongue 71 in the slot 65. The latch member 68 then may be adjusted to cause the leg 71 to pass through the slot 65 and through the opening 78 and the tongue 77, and the loop 76 may be anchored to a stud or the like on the open stopper of the sampler. In these positions of the parts the spring 16 tends to rotate the case 23 clockwise to the rest position shown in FIG. 2, but such rotation is precluded because of the reaction between the latch leg 71 and the tongue 77.

In operation, the assembly of the sampler 1 and the thermometer frame may be lowered to a predetermined depth and the stopper closing mechanism actuated as disclosed in U.S. Pat. No. 4,027,538 to move the stoppers into sealing engagement with the ends of the sampler tube 2 of the sampler, thereby trapping within the sampler tube a sample of water. Such movement of the stoppers will slacken the cable 75 and enable the spring 73 to move the latch member 68 to the release position shown in FIG. 1, whereupon the spring 16 then will cause the case 23 to rotate clockwise to the position shown in FIG. 2 and effect reversal of the position of the case relative to the sampler 1. Rotation of the case through more than 180° is prevented by engagement of a pin 21 with the end wall of the groove 9.

Following reversal of the position of the case, the apparatus may be retrieved from the body of water and the thermometers removed from the case.

To remove the thermometers from the case, the nuts 40 are turned in a direction to remove them from their recesses 54, following which the closure 41 may be slid to the position shown in FIG. 4 and subsequently rotated as indicated in FIG. 5.

An important characteristic of the invention is that if the nuts 40 fail to be seated in their recesses, it is extremely unlikely that the thermometers inadvertently can escape the case. This is due to the fact that the closure 41 cannot be rotated relative to the body 24 until such time as the closure has been slid in a direction away from the open end of the body a distance sufficient to enable the fingers 51 to clear the side walls 36 of the grooves 33. Such movement of the closure 41 is highly unlikely if the assembly is lowered into the water in a position such that the closure 41 is uppermost. That is, the force of gravity and water pressure will prevent upward movement of the closure 41.

On the other hand, if the assembly is lowered into the water in a position in which the closure 41 is lowermost, thereby enabling lowering movement by gravity of the closure 41 relative to the body 24, gravity also will exert a force on the thermometers causing them to follow the movement of the closure. Thus, even if movement of the closure relative to the body is sufficient to withdraw the fingers 51 from beneath the side walls 36 of the grooves 33, the thermometers will bridge the distance between the members 24 and 41 and prevent rotary movement of the closure.

If an additional safeguard against inadvertent rotary movement of the closure 41 is desired, the free end of the body 24 may be provided with one or more locking pins 79 (FIG. 2) which extend beyond the upper wall 26, and the extension 44 of the closure's upper wall may be provided with openings 80 for reception of the pins 79. The pins thus will function to prevent rotation of the closure 41 when the latter is in its cavity-closing position, even though the fingers 51 may be sprung or broken.

The disclosed embodiment is representative of a presently preferred form of the invention, but is intended to be illustrative rather than definitive thereof. The invention is defined in the claims.

I claim:

1. In a reversing thermometer frame having a base member, a body member having a chamber therein open at one end for accommodating at least one thermometer, means rotatably coupling said body to said base, means biasing said body to rotate in one direction relative to said base from a first position to a second position, and means for releasably latching said body in said first position, the improvement comprising a closure at said one end of said body for selectively opening and closing said one end of said chamber; means mounting said closure on said body for sequential and rotary movements relative thereto between chamber opening and chamber-closing positions; and means for releasably retaining said closure in its chamber-closing position.

2. Apparatus according to claim 1 wherein said mounting means comprises a pair of fingers carried by said closure and straddling said body.

3. Apparatus according to claim 2 wherein said body has grooves in which said fingers are slidably accommodated.

4. Apparatus according to claim 2 wherein said mounting means includes means carried by said body and forming a fulcrum about which said closure is rotatable.

5. Apparatus according to claim 2 wherein each of said fingers has a slot therein, and including pivot means carried by said body and extending from opposite sides thereof through the respective slots.

6. Apparatus according to claim 5 including adjustable locking means carried by said pivot means for movement into and out of engagement with the respective fingers.

7. Apparatus according to claim 6 wherein each of said fingers is recessed to accommodate the associated locking means.

8. Apparatus according to claim 1 wherein said coupling means comprises a hub carried by one of said members and a rotor carried by the other of said members and mounted on said hub.

9. Apparatus according to claim 1 wherein said biasing means comprises torsion spring means interposed between and connected to each of said members.

10. Apparatus according to claim 9 wherein said coupling means comprises a hub carried by one of said members and a rotor carried by the other of said members and mounted on said hub, said spring means being accommodated within said hub.

11. Apparatus according to claim 1 including guide means acting between said body member and said closure for guiding the linear movement of the latter.

12. Apparatus according to claim 11 wherein said guide means comprises fingers on said closure and grooves in said body member and in which said fingers are slidably accommodated.

13. Apparatus according to claim 1 including limit means acting between said body member and said closure for preventing rotary movement of the latter until said closure has moved linearly a predetermined distance from said one end of said body member.

14. Apparatus according to claim 13 wherein said limit means comprises an elongate member carried by said body members and removably accommodated in an opening formed in said closure.

15. A case for an elongate device such as a thermometer comprising a body member open at one end and having a chamber for the accommodation of said device; a closure member for said one end of said body member; and means mounting said closure member on said body member for linear movements longitudinally of said body member and for rotary movements relative to said body member, said mounting means comprising at least one extension carried by one of said members for slidable accommodation in a groove formed in the other of said members; means forming a fulcrum about which said closure may rotate, and means carried by said other of said members and reacting with said extension for preventing rotation of said closure member relative to said body member except when said closure member occupies a predetermined position longitudinally of said body member.

16. A case according to claim 15 wherein said extension comprises an elongate finger having a slot therein for the slidable accommodation of said fulcrum forming means.

17. A case according to claim 15 wherein said rotation preventing means comprises walls extending along said groove and overlying said extension.

18. A case according to claim 17 wherein one of said side walls is shorter in length than the other.

19. A case according to claim 15 wherein said extension is carried by said closure member and said groove is formed in said body member.

* * * * *

UNITED STATES PATENT AND TRADEMARK OFFICE
CERTIFICATE OF CORRECTION

PATENT NO. : 4,319,486
DATED : March 16, 1982
INVENTOR(S) : Edmund P. Deja

It is certified that error appears in the above-identified patent and that said Letters Patent are hereby corrected as shown below:

In the abstract, line 7, change "biase" to -- base --.

Column 2, lines 18 and 19, change "chamber" to -- chambers --.

Column 2, line 28, change "chamber" to -- chambers --.

Column 4, line 47, change "closue" to -- closure --.

Column 7, line 40, after " sequential" add -- linear --.

Signed and Sealed this

Eighteenth Day of May 1982

[SEAL]

Attest:

Attesting Officer

GERALD J. MOSSINGHOFF

Commissioner of Patents and Trademarks